(No Model.)

J. S. CABANNÉ.
VETERINARY CURB COMPRESS.

No. 417,810. Patented Dec. 24, 1889.

Witnesses
H. W. Elmore
W. L. Hillyer

Inventor
James S. Cabanné
By his Attorneys
Rich'd H. Spencer

UNITED STATES PATENT OFFICE.

JAMES S. CABANNÉ, OF ST. LOUIS, MISSOURI, ASSIGNOR TO RICHARD H. SPENCER, OF WASHINGTON, DISTRICT OF COLUMBIA.

VETERINARY CURB-COMPRESS.

SPECIFICATION forming part of Letters Patent No. 417,810, dated December 24, 1889.

Application filed August 16, 1889. Serial No. 320,992. (No model.)

*To all whom it may concern:*

Be it known that I, JAMES S. CABANNÉ, a citizen of the United States, residing at the city of St. Louis, in the State of Missouri, have invented certain new and useful Improvements in Curb-Compresses for the Treatment of Curb on Horses; and I do hereby declare the following to be a full, clear, and exact description of the invention, such as will enable others skilled in the art to which it appertains to make and use the same.

My invention has for its object to provide a cheap, simple, easily-applied, and effective device for the cure of "curb" or other enlargements upon the legs of horses or other animals; and it consists in the boot for that purpose constructed as hereinafter described, and broadly pointed out in the claim.

Figure 1:
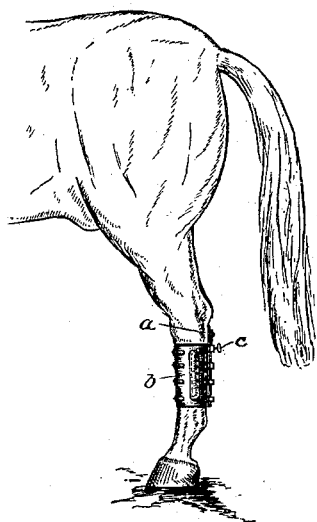
Figure 3:
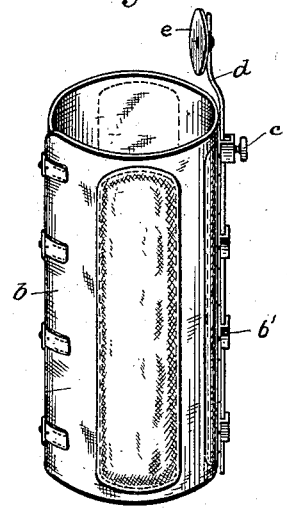
Figure 2:
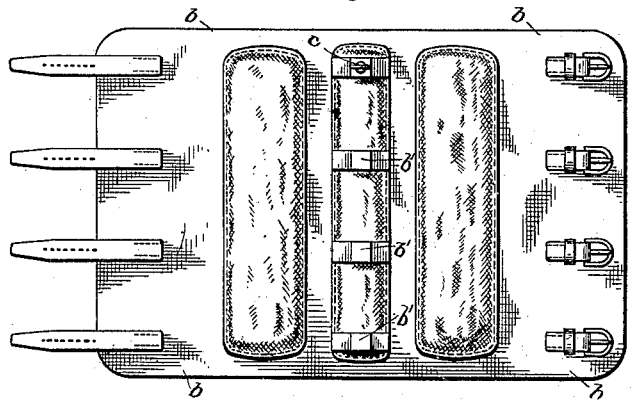
Figure 4:
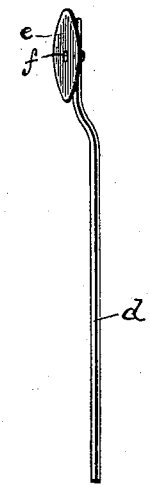
Figure 6:
Figure 5:

Referring to the drawings, Figure 1 represents a side view of the hind leg of a horse with the device attached thereto. Fig. 2 represents the appliance when open. Fig. 3 represents the appliance when closed. Fig. 4 represents a compress steel spring—front and side view. Fig. 5 represents a brass slot or guide. Fig. 6 represents a brass slot or guide with screw for regulating pressure.

Similar letters of reference indicate corresponding parts in all the figures of the drawings.

The letter $a$ in Fig. 1 indicates about the point on the legs of horses or other animals where the excrescence or enlargement known as "curb" usually appears.

$b$ indicates a boot made of canvas, leather, or other material, having suitable buckles and straps along its opposite edges, whereby it may be clasped around the leg of the animal. This boot may be provided with pads of felt or other soft material for an obvious purpose, as shown in the drawings.

$b'$ denotes clips or guides arranged in line vertically on one side of the boot, and $c$ indicates a thumb-screw in one of these guide-clips, preferably the uppermost one, by means of which the shank of the compress-button is secured at different heights and with varying pressure.

$d$ denotes the shank of this compress-button; $e$, the button proper, the shank being preferably formed of spring metal and the button secured to the upper end thereof by means of a pivoted pin $f$, permitting it to have a certain freedom of motion. This button may be formed of metal, horn, or other suitable material, and is preferably concave on the side next to the leg of the animal, as shown in the drawings.

The construction being as thus described, the application and operation of the device will be obvious. The boot being properly strapped to the leg of the animal below the curb, the compress-button is adjusted over the curb, and the thumb-screw screwed down, so as to hold the shank in that position. The shank, being made of spring metal, causes the button to exert a constant pressure upon the enlargement.

While this device or appliance is especially designed to be used on the legs of horses for reducing enlargements, it may also be used, with slight modification, on other animals and human beings.

Having described my device for the reduction and cure of curb and other enlargements upon the same principle, the parts being constructed as described, what I claim for my invention is—

A device designed for the curing of curb in horses or other animals, consisting of the boot $b$, having suitable straps and buckles at its opposite edges, whereby it may be secured to the leg of the animal, the guide-clips $b'$, the thumb-screw $c$, and the compress-button $e$ on the upper end of the shank $d$, the latter adapted to be secured in the guide-clips at different positions by means of the thumb-screw, substantially as described.

In testimony whereof I affix my signature in presence of two witnesses.

J. S. CABANNÉ.

Witnesses:
 AUGUSTUS BERTHOLD,
 J. DE MUN. SMITH.